United States Patent [19]
Teng et al.

[11] Patent Number: 6,094,679
[45] Date of Patent: Jul. 25, 2000

[54] DISTRIBUTION OF SOFTWARE IN A COMPUTER NETWORK ENVIRONMENT

[75] Inventors: Chia-Chi Teng; Babak Jahromi, both of Redmond, Wash.

[73] Assignee: Microsoft Corporation, Redmond, Wash.

[21] Appl. No.: 09/008,522

[22] Filed: Jan. 16, 1998

[51] Int. Cl.⁷ .............................................. G06F 15/177
[52] U.S. Cl. ......................... 709/220; 709/217; 709/221
[58] Field of Search .................................. 709/220, 217, 709/221, 224, 226; 395/712; 380/25

[56] References Cited

U.S. PATENT DOCUMENTS

| | | | |
|---|---|---|---|
| 5,666,293 | 9/1997 | Metz | 709/220 |
| 5,706,502 | 1/1998 | Foley | 707/10 |
| 5,708,709 | 1/1998 | Rose | 380/4 |
| 5,768,539 | 6/1998 | Metz | 709/249 |
| 5,768,597 | 6/1998 | Simm | 395/712 |
| 5,809,145 | 9/1998 | Slik | 380/25 |
| 5,919,247 | 7/1999 | Hoff | 709/217 |
| 5,923,885 | 7/1999 | Johnson | 395/712 |
| 5,931,909 | 8/1999 | Taylor | 709/221 |

OTHER PUBLICATIONS

"Printer MIB",. Mar. 1995, Smith et. al., Internet Network Working Group.
"Internet Printing Protocol/1.0", Jul. 25, 1997 DeBry et al., Internet Network Working Group.
"Inside Windows NT", Custer, 1993, Chapter Nine entitled "Networking".
"Hypertext Transfer Protocol–HTTP/1.1", Jan. 1997, Fielding et al., Internet Network Working Group.
"An Extension to HTTP: Digest Access Authentication", Jan. 1997, Franks et al., Internet Network Working Group.
180/IEC ID175–2; Sep. 1, 1996.
180/IEC 10175–1; Sep. 1, 1996.

*Primary Examiner*—Zarni Maung
*Assistant Examiner*—Khanh Quang Dinh
*Attorney, Agent, or Firm*—Leydig, Voit & Mayer, Ltd.

[57] ABSTRACT

A method of distributing software files resident on a network server to a network client. To effectuate the distribution, the network client issues an HTTP formatted request message to the network server which requests that certain software files resident on the network server be downloaded to the network client. The HTTP formatted request message may include information indicative of one or more of the operating system or processor architecture associated with the network client that the network server can use as an aide in determining which software files to return to the network client. The software files are bundled into a cabinet file by the network server and returned to the network client which, in turn, automatically unbundles the cabinet file, checks the authenticity of certain of the individual software files, and installs the software files in an appropriate memory location associated with the network client. In this manner, a world wide distributed printing solution is provided that is capable of working transparently on intranets and the Internet.

18 Claims, 8 Drawing Sheets

DISTRIBUTION OF SOFTWARE IN A COMPUTER NETWORK ENVIRONMENT

FIELD OF THE INVENTION

This invention relates generally to computer network environments and, more particularly, relates to an implementation of a computer network environment that provides a method for distributing software.

BACKGROUND OF THE INVENTION

The continual and rapid development of computers, computer software and related technology has revealed many problems in currently employed methods of distributing software. These problems are especially profound with respect to the distribution of software that is required to interact directly with the operating system of a computer, e.g., hardware related software such as printer drivers, etc. For example, since new versions of operating systems typically ship every 1.5 to 2 years while new models of hardware, e.g., printers, typically ship every month, it is unrealistic to expect vendors to wait until the release of a new or updated version of the operating system to have the software needed to support the operation of their hardware distributed as a component part of the operating system environment. Accordingly, hardware vendors have been forced to find other methods for distributing their hardware related software during those times between operating system releases.

A known method for distributing software is disclosed in commonly owned, pending U.S. patent application Ser. No. 08/641,087 U.S. Pat. No. 5,692,111, entitled "Automatic Installation Of Printers In A Distributed Environment", which is continuation of U.S. patent application Ser. No. 08/318,070 now abandoned filed Oct. 5, 1994 by Marby et al. and which is incorporated herein by reference in its entirety. In particular, the '087 application relates to the installation of a printer on a network client in a local area network which is performed in support of a point-and-print operation. The point-and-print capability allows a user to print on any printer available within the distributed network by merely selecting a printer and then requesting to print on that printer. The printer is installed by performing the steps of retrieving configuration software files from a network server that includes the target printer and automatically installing the retrieved software files on the network client. The retrieval and installation of the software files is performed transparently relative to the user of the network client.

While the system disclosed in the '087 application works for its intended purpose in implementations of local area networks, it is not intended to be used to distribute software in wide area networks such as the Internet. In particular, since the '087 application relates to a closed, local area network, the '087 application fails to address, among other things, problems associated with security, (e.g., software source verification, virus checking, etc.), the speed of data transmission, or platform incompatibilities which are known problems in wide area networks such as the Internet. Furthermore, it will be appreciated that, since such networks are closed, the only method available for initially placing the printer configuration software files on the network server (after which time the software files are available for downloading to the network clients) is the conventional method of manually installing the software files from a storage media such as a floppy disk, CD ROM, or the like. Accordingly, it is seen that this method provides no advantage to vendors who must still produce a large number of copies of their software on conventional storage media that then must be shipped to distributors and retailers for sale to the end user.

In commonly owned, pending U.S. patent application Ser. No. 08/634,390 entitled "Method For Identifying And Obtaining Computer Software From A Network Computer", filed on Apr. 18, 1996 by Slivka et al., which is incorporated herein by reference in its entirety, a method for distributing software in a wide area network such as the Internet is disclosed. In particular, the '390 application discloses an update service which automatically inventories the network client to determine if any of its resident software files are out-of-date and/or in need of maintenance updates. If it is determined that software updates are required, the network server automatically downloads the needed software files in a compressed form to the network client along with a secure software installation application. The installation application downloaded by the network server is provided to cause the automatic installation of the downloaded software files on the network client.

While the system disclosed in the '390 application works for its intended purpose, it also suffers from various disadvantages. For example, no method is provided for automatically determining the form of the platform of the network client. Therefore, time may be wasted downloading software files that are incompatible with the platform of the network server. Additionally, since the installation application is provided by the network server, there is also a risk that the installation application will not properly operate in connection with the particular platform of the network client, i.e., it will not execute, it will install the software files in the wrong memory locations, etc.

A further disadvantage found in the method described in the '390 application lies in the fact that, while the installation application is itself provided with a digital signature for use in providing a measure of security, the executable software files, i.e., the .EXE, .DLL and .DRV software files, downloaded from the network server are not provided with any means to individually check their source. This oversight subjects the network client to a risk of installing unverified individual executable software files which may contain code capable of corrupting the network client. This is especially a concern with respect to hardware related software which executes in the kernal mode of the operating system. As a result of these disadvantages, users generally continue to install software in the conventional manner, i.e., from purchased floppy disks, CD ROMs, etc. which, as discussed, is the method for software distribution least desired by vendors.

From the foregoing, it is seen that a need remains for an improved method by which vendors may distribute their software. In particular, a need exists for a method by which vendors may economically and efficiently distribute software which minimizes the need for vendors to suffer the monetary and time costs associated with manufacturing a large number of copies of the software on conventional storage media, shipping of the software to retailers, etc. It is further desirable for vendors to eliminate the various problems associated with utilizing a retailer which include, among other things, retailer price markups, relying on the retailer to promote and move the product, lack of retailer knowledge about the subject software, etc. Most importantly, it is evident that a need exists for a software distribution system that is trusted by end users and that can be implemented transparently on intranets and the Internet, contributing to the creation of a world wide distributed printing solution.

SUMMARY OF THE INVENTION

According to these needs, the present invention is generally directed to method of retrieving and downloading software files in a computer network having a network client linked to a network server in a wide area network, such as the Internet. The software is preferably hardware related software, such as printer driver/configuration files relating to a printer attached to the network server. The method allows for these software files to be retrieved by the network client, checked for authenticity, and automatically installed.

In the described embodiment, once the hardware related software has been properly installed on the network client, the network client may communicate with the hardware for the purpose of performing a specific operation. For example, the network client can request the remote printing of a file by the hardware in accordance with the description contained in commonly owned, pending U.S. patent application Ser. Nos. 08/932,722 and 08/932,723, both of which were filed on Sep. 18, 1997 by Teng et al. and both of which are incorporated herein by reference in their entirety.

Specifically, using a browser application, the user may link to a network server that supports the downloading of one or more software files. The software files that are available for downloading are preferably displayed to the user by the network server in the form of a Hypertext Markup Language ("HTML") page with associated hypertext links. In this manner, the user need only click on the desire hypertext link to initiate the downloading of the desired software file. As will be appreciated, the hypertext link contains the Uniform Resource Locator ("URL") address of the network server and a Hypertext Transfer Protocol ("HTTP") formatted message that functions to inform the network server that a download has been requested. Additionally, the HTTP formatted message may have appended to it further information that may be used to identify the configuration of the platform of the network client, e.g., the processor architecture of the network client, the brand of the operating system running on the network client, and the version of the operating system. This information is preferably gathered by an executable object which functions to gather the information by polling the appropriate files associated with the operating system running on the network client.

Once the HTTP formatted message arrives at the network server, the network server parses the message and retrieves the requested software files, in particular, as a function of the printer identified in the message and the information appended to the message. These software files are then compressed into a cabinet file and returned to the network client. Upon the return receipt of the cabinet file by the network client, an application resident on the network client will decompress the cabinet file and, thereafter, call an authentication application which will check any decompressed executable software files for a digital signature. If the user decides to accept the software files (i.e., he/she is displayed with the source of the software files and given the option to "install" or "abort"), the resident application will pass the files to an installation application, such as an Add Printer Wizard application, that, in turn, functions to install the software files in the appropriate memory locations of the network client.

From the foregoing, it will be appreciated that the invention overcomes the noted deficiencies in the prior art. In particular, these deficiencies are addressed by, among other things,: 1) utilizing digital signatures in connection with all downloaded executable software files which minimizes the risk of installing harmful software files from an untrustworthy network server; 2) incorporating the resident application into the operating system of the network client which minimizes the risk that the downloaded software files are not properly installed; 3) polling the network client to determine its platform configuration in connection with the downloading of the software files which minimizes the risk that the network server returns software files which are mismatched with respect to the particular platform of the network client; and 4) utilizing the HTTP protocol that provides the means for the remote installation of the printer to work transparently on both intranets and the Internet.

A better understanding of the objects, advantages, features, properties and relationships of the invention will be obtained from the following detailed description and accompanying drawings which set forth illustrative embodiments which are indicative of the various ways in which the principles of the invention may be employed.

BRIEF DESCRIPTION OF THE DRAWINGS

For a better understanding of the invention, reference may be had to the preferred embodiments shown in the accompanying drawings in which.

DETAILED DESCRIPTION OF THE INVENTION

Figure 1:
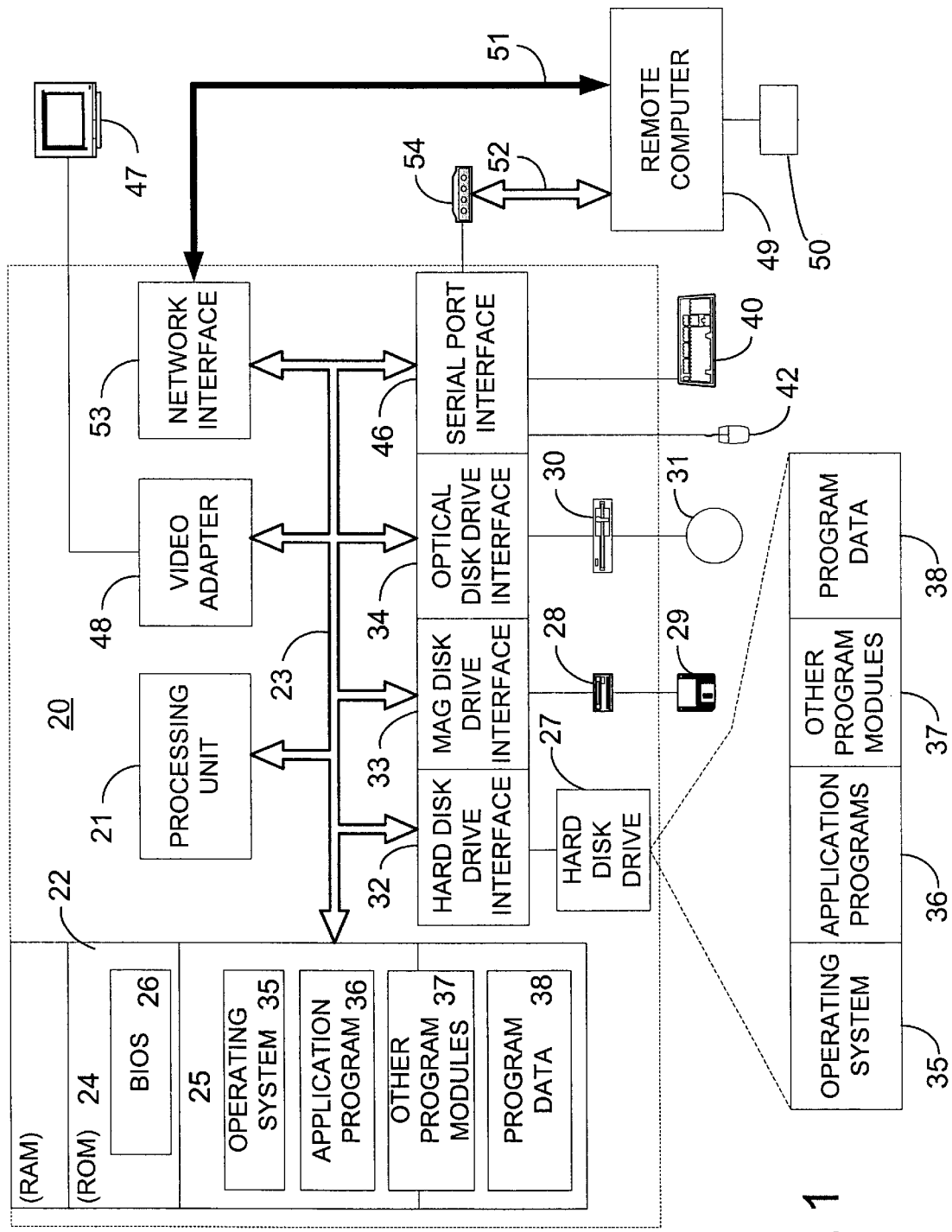
FIG. 1 illustrates a general block diagram schematic view of a computer system on which the invention resides.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, such as smart printers, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a network client general in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the network client 20, such as during start-up, is stored in ROM 24. The network client 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the network client 20. Although the exemplary environment described herein employs a hard disk, a removable magnetic disk 29, and a removable optical disk 31, it will be appreciated by those skilled in the art that other types of computer readable media which can store data that is accessible by a computer, such a magnetic cassettes, flash memory cards, digital video disks, Bernoulli cartridges, random access memories, read only memories, and the like may also be used in the exemplary operating environment.

A number of program modules may be stored on the hard disk, magnetic disk 29, optical disk 31, ROM 24 or RAM 25, including an operating system 35, one or more applications programs 36, other program modules 37, and program data 38. A user may enter commands and information into the network client 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The network client 20 operates in a networked environment using logical connections to one or more remote network servers, such as a network server 49. The network server 49 may be another personal computer, a server, a router, a network PC, a peer device or other common network node, and typically includes many or all of the elements described above relative to the network client 20, although only a printer 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the network client 20 is connected to the local network 51 through a network interface or adapter 53. When used in a WAN networking environment, the network client 20 typically includes a modem 54 or other means for establishing communications over the WAN 52. The modem 54, which may be internal or external, is connected to the system bus 23 via the serial port interface 46. In a networked environment, program modules depicted relative to the network client 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by the network client 20 and network server 49, unless indicated otherwise. As such, it will be understood that such acts and operations, which are at times referred to as being computer-executed, include the manipulation by the CPUs of the devices of electrical signals representing data in a structured form. This manipulation transforms the data or maintains it at locations in the memory system, which reconfigures or otherwise alters the operation of the network client 20 and/or the network server 49 in a manner well understood by those skilled in the art of computer systems. The data structures where data is maintained are physical locations of the memory that have particular properties defined by the format of the data. While the invention is being described in the foregoing context, it is not meant to be limiting as those skilled in the art of computer systems will further appreciate that various of the acts and operation described herein may also be implemented in hardware.

Figure 2:
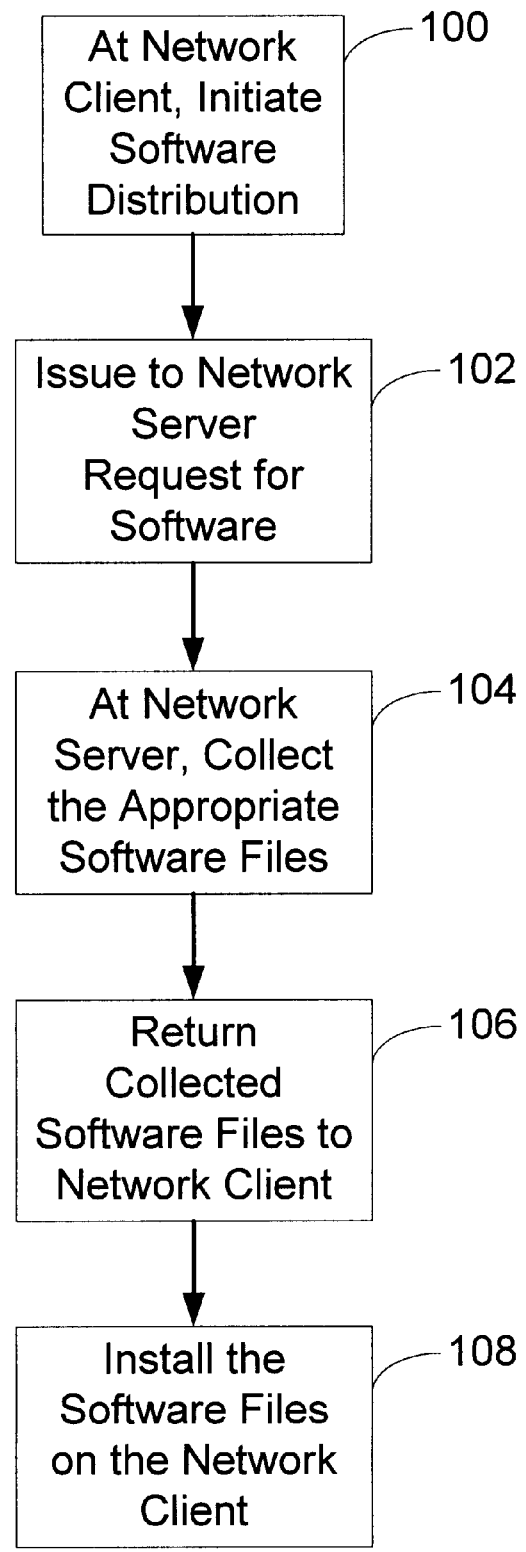
FIG. 2 illustrates a flow chart diagram of the general steps for distributing software in accordance with the invention.

As previously mentioned, the invention is preferably realized within the computer environment illustrated in FIG. 1 as one or more computer-executable applications 36 which provide for the installation of the printer 50 on the network client 20. Generally, with reference to FIG. 2, the installation of the printer 50 on the network client 20 is initiated in step 100 from a browser application process which allows the user to command that an HTTP formatted installation request message be issued in step 102 to the network server 49. In response to the receipt of the installation request message, the network server 49 gathers in step 104 those software files necessary to comply with the request which software files are returned in step 106 to the network client. The network client 20 then executes in step 108 an installation application that functions to install the software files returned from the network server 49 on the network client 20.

Figure 3:
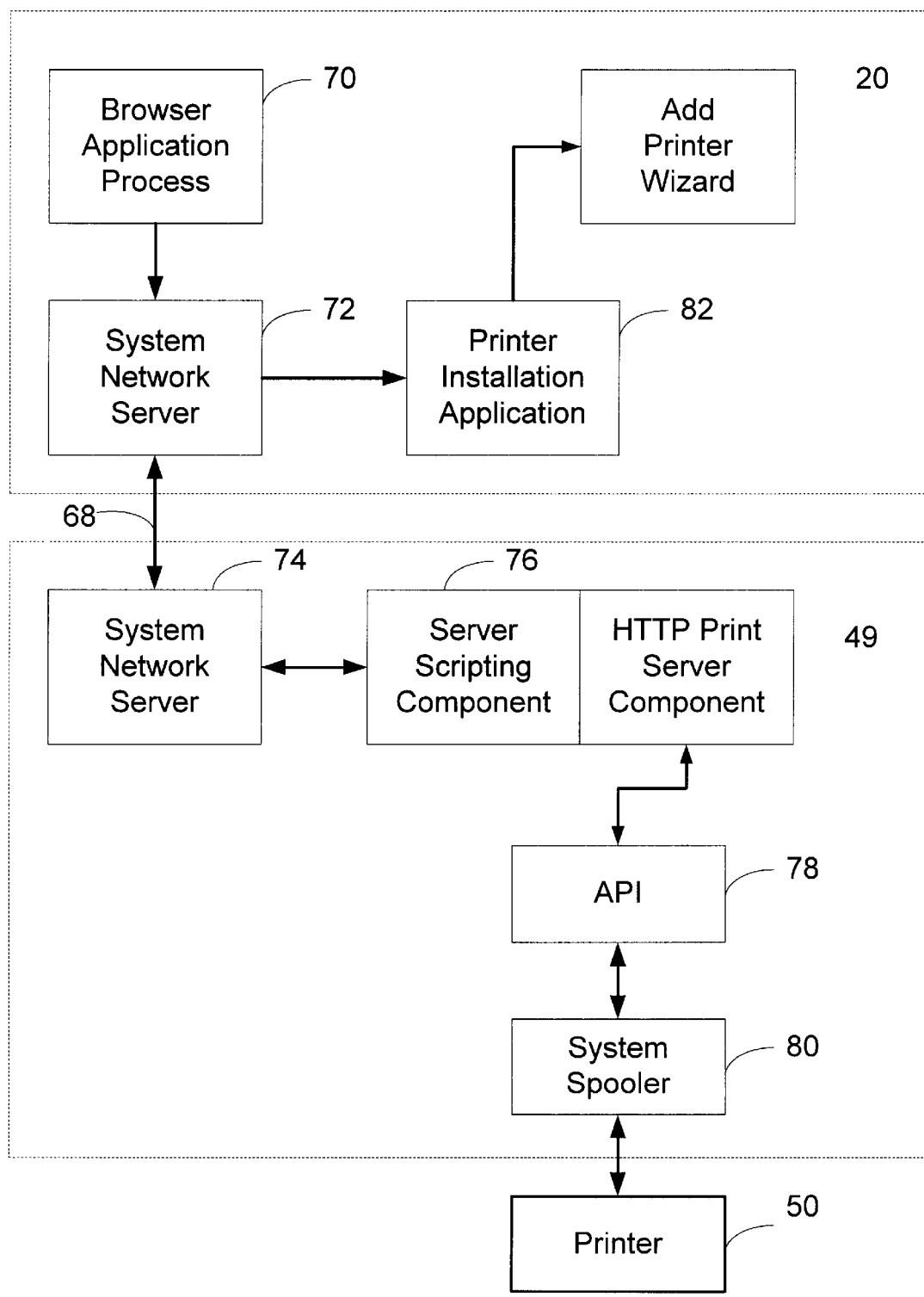
FIG. 3 illustrates a block diagram schematic view of an implementation of a computer network constructed in accordance with the invention which is utilized to distribute printer related software files.

With reference to FIG. 3, to support the method for distributing software, the network client 20 generally includes a browser application process 70, such as Microsoft's Internet Explorer brand browser, Netscape's Navigator brand browser, or the like, and an associated system Internet network server 72. Additionally, the network client 20 includes a Printer Installation Application 82 that is preferred to be a component part of the operating system environment of the network client 20. Meanwhile, the network server 49 generally includes a system Internet network server 74 that is linked to a server scripter component 72, such as an Internet Server API (ISAPI) wrapper, that includes a HTTP print server component. A system spooler 74 is connected to the server scripter component 72 via an API 76 and to the printer 50 that is to be installed in accordance with the description that follows. It is to be noted that the network server 49 may be implemented as a personal computer, standalone, smart printer or the like having the components discussed.

Figure 4:
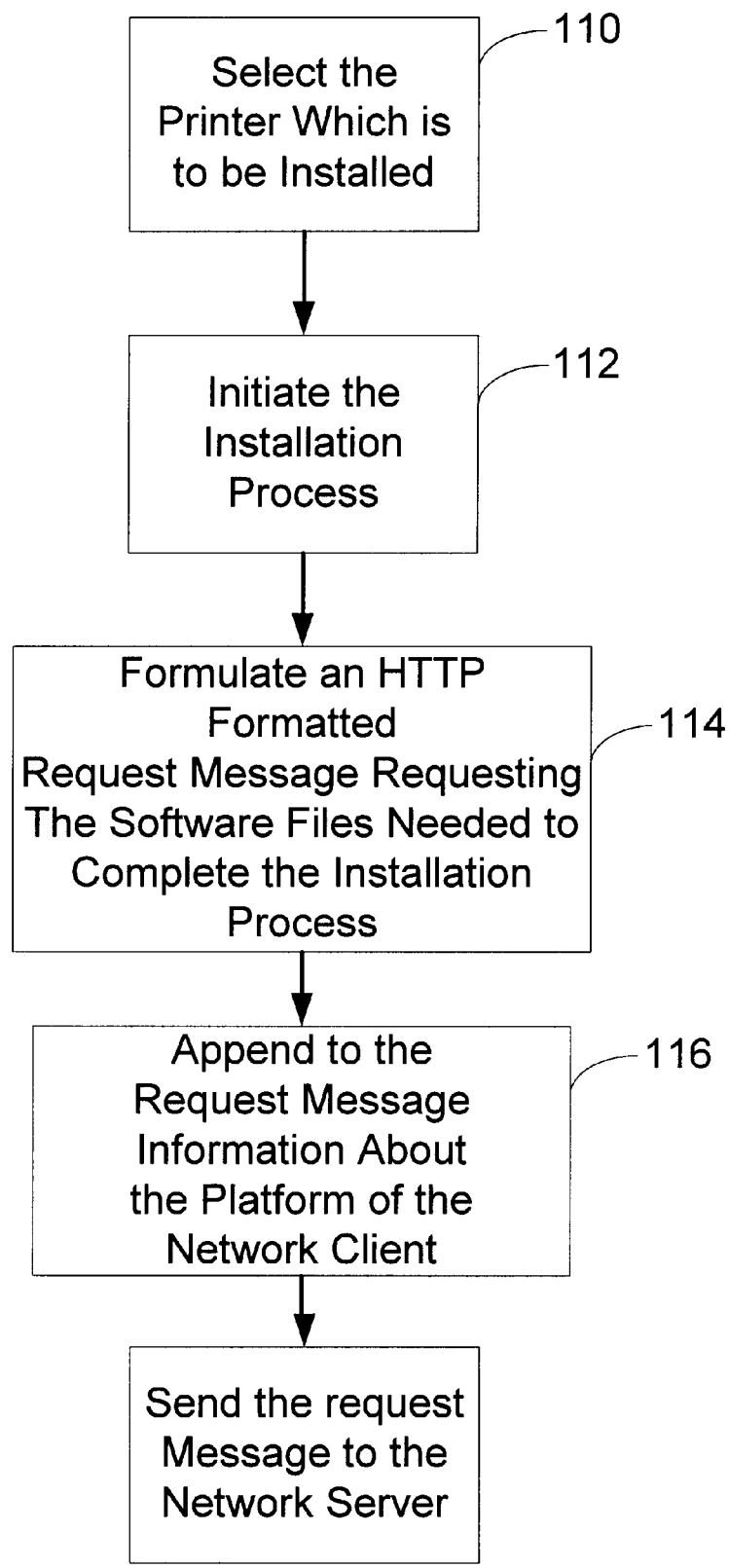
FIG. 4 illustrates a flow chart diagram of the steps for formulating a request at the network client to initiate the software distribution in accordance with the invention.
Figure 5:
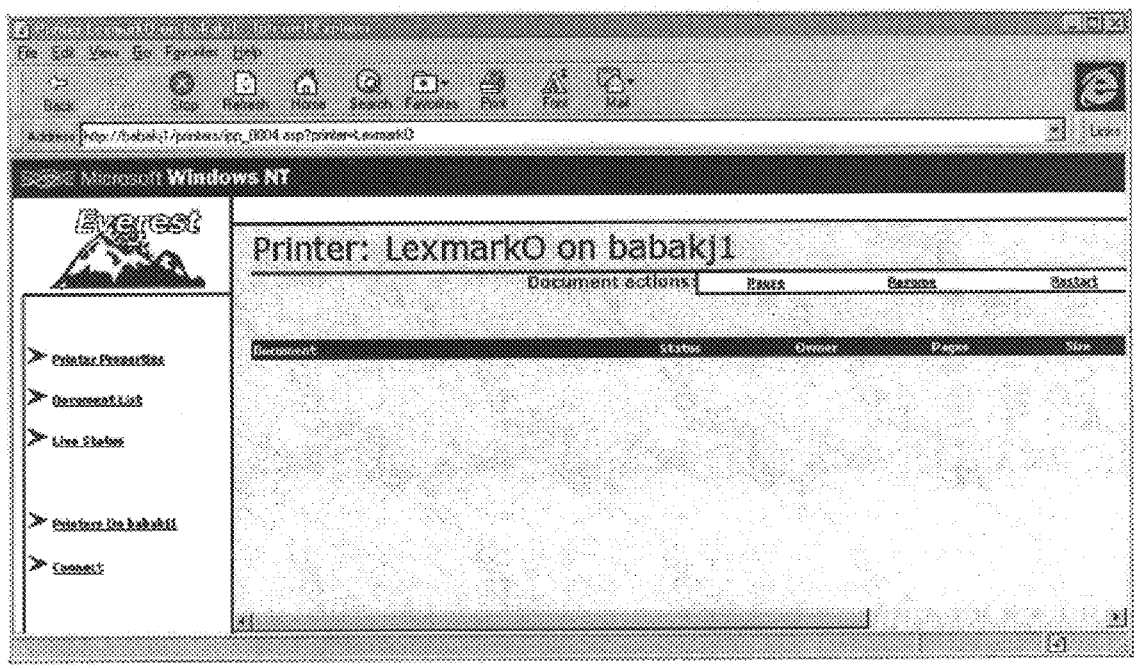
FIG. 5 illustrates an HTML page that may be used as a home page to initiate the software distribution in accordance with the invention.

More specifically, with reference to FIG. 4, the process of installing the printer 50 on the network client 20 may be initiated by interacting with a graphical user interface, for example, an HTML page displayed by the browser application process 70, that Preferably contains a listing of one or more printers that are available for installation and an "Install Printer" command icon or the like. In a preferred embodiment, the HTML coded instructions for use in generating the HTML page on the browser application process 70 are received from the network server 49 which supports the printer which is to be installed. In this manner, the user selects the desired printer in step 110 and initiates the installation process in step 112 by activating an "Install Printer" icon or the like type of interactive feature that is supported by HTML. An example of an HTML page that may be used as a home page for implementing printer installation and point-and-print is illustrated in FIG. 5. Meanwhile, Appendix A includes an exemplary HTML source for use in connection with a browser that allows a user to initiate the printer installation operation described herein.

In response to the activation of the "Install Printer" icon, an HTTP formatted request message is formulated in step 114 that includes the URL address of the network server 49, for use in routing the message to the network server 49, as well as a field identifying the printer 50 and a field which functions to inform the network server 49 that an installation has been requested. For reasons which will be discussed in greater detail hereinafter, an optional data field which provides the network server 49 with information about the network client 20 may also be appended in step 116 to the HTTP formatted request message before the message is issued to the network server 49. In this manner, the HTTP formatted message may take the following form:

http://server/scripts/sharename/.printer?createExe&info

It is to be appreciated that this described method for selecting printers and initiating the distribution process from an HTML page is meant to be illustrative only and that other methods for selecting printers and initiating the distribution process from the network client are contemplated and desired to be included within the scope of the subject invention.

As discussed, the data field that may be appended to the HTTP formatted request message is provided to identify to the network server 49 the form of the platform of the network client 20. This data field is preferably a 32 bit field packaged as one DWORD parameter of which one byte is a representation of the major version number of the operating system, one byte is a representation of the minor version number of the operating system, one byte is a representation of the brand of the operating system, and one byte is a representation of the processor architecture of the network client 20. This information is preferably gathered and appended to the HTTP formatted request message by a polling object OLEPRN.DLL in the form of an Active X COM object resident on the network client 20 which is executed in response to the activation of the "Install Printer" icon. It will be understood that the information is retrieved by the polling object performing a query of the appropriate file within which the information would be contained which is typically dependent upon the configuration of the operating system of the network client 20. For example, the information would be contained within appropriate data fields in the registry files in a network client 20 utilizing a Windows NT brand operating system or a Windows 95 brand operating system, i.e., the brand and major and minor version numbers of the operating system obtained from the OSVERSIONINFO data field and the processor architecture information from the SYSTEM_INFO field.

It will further be appreciated that the use of HTTP formatting dramatically increases the scope of the subject invention. In particular, the use of the HTTP protocol allows the subject invention to expand beyond private networks allowing it to work across the Internet, through proxys and firewalls. In this manner, the subject invention effectively allows for a world wide deployment of print servers over the World Wide Web.

Figure 6:
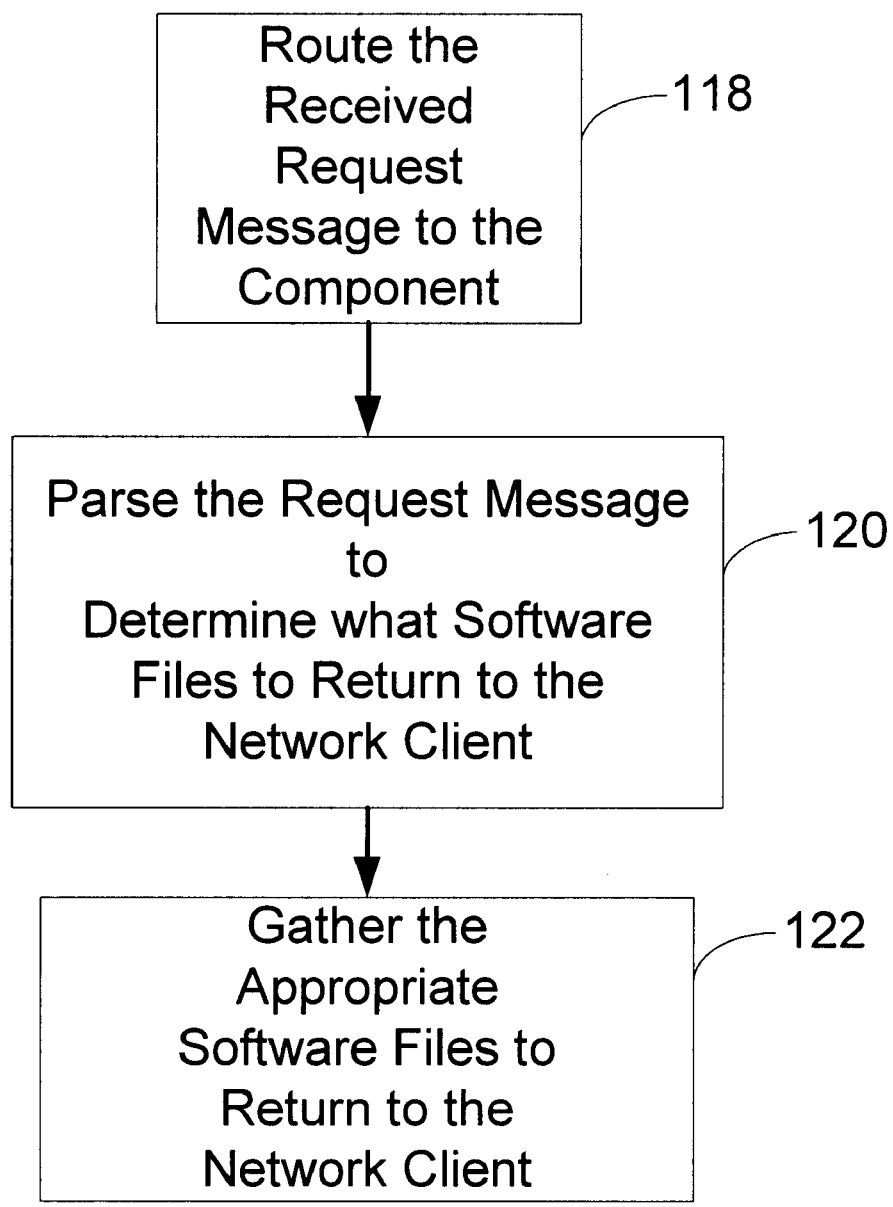
FIG. 6 illustrates a flow chart diagram of the steps for gathering at the network server the requested software in accordance with the invention.

Turning to FIG. 6, after the HTTP formatted request message has been formulated and issued to the network 68 by the system network server 72, it is received by the system network server 74 of the network client 49. Upon the receipt of the message, the system network server 74 uses the URL address of the message to further route the message in step 118 to the server scripting component 76. The server scripting component 76 then functions to parse in step 120 the HTTP formatted request message to extract therefrom the information pertaining to the identity of the printer for which installation is being requested as well as the information pertaining to the platform of the client computer 20. This information is then utilized in step 122 to gather the appropriate software files that are needed at the network client 20 to effectively install the printer thereon.

Figure 7:
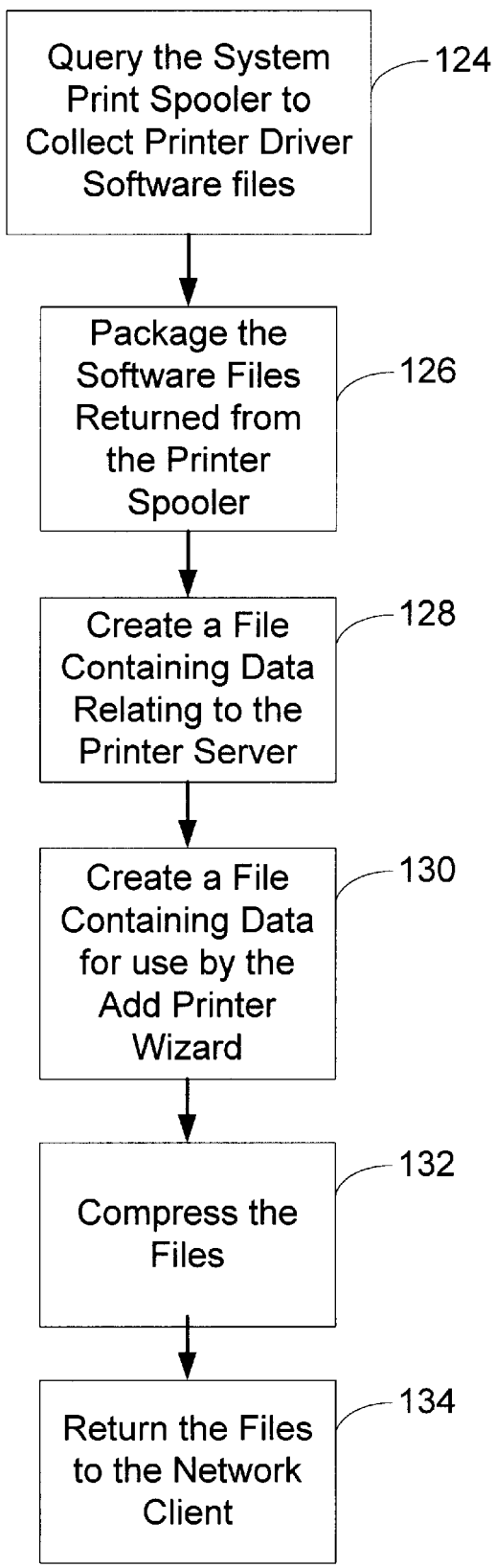
FIG. 7 illustrates a flow chart diagram of the steps for gathering at the network server printer related software files in accordance with the invention.

In particular, with reference to FIG. 7, the server scripting component 76 queries in step 124 the system spooler 80 to retrieve therefrom the printer driver software files for the specified printer, in this example printer 50. In connection with this retrieval, the information contained in the data field appended to the HTTP formatted request message pertaining to the form of the platform of the network client 20 may be utilized by the server scripting component 76 to direct the system spooler 80 as to exactly which printer driver software files to return in response to the query, i.e., only those drivers which can operate in conjunction with the version of the particular operating system and processor architecture of the network client 20 are to be returned.

In a preferred embodiment of the invention, all executable printer driver software files, i.e., all .EXE, .DLL and .DRV files, have a digital signature that is provided to them by their original distributor in accordance with known conventions. As digital signatures are discussed in greater detail in pending U.S. patent application Ser. No. 08/634,390 entitled "Method For Identifying And Obtaining Computer Software From A Network Computer", filed on Apr. 18, 1996 by Slivka et al., which has been incorporated herein by reference in its entirety, they will not be discussed in greater detail herein. The retrieved printer driver software files, and other files discussed hereinafter, will then be packaged in step 126 by the server scripting component 76 into a cabinet file having an .IPP extension.

During the retrieval and packaging of the driver files, the server scripting component 76 is also used to create in step 128 a .BIN file which contains data pertaining to the server settings of the printer 50 and in step 130 a .DAT file which contains command lines which will be used by the Add Printer Wizard resident on the network client 20. As will be understood by those of skill in the art, the Add Printer Wizard is used to automatically install printers when provided the necessary files.

In an illustrative embodiment, the .BIN file contains the printer server settings pulled out of the PrinterDriverData and Color keys for the printer, the DEVMODE of the printer, and, optionally, data describing any non-default color settings, tuning characteristics, etc. of the printer. An exemplary file format for the .BIN file is as follows:

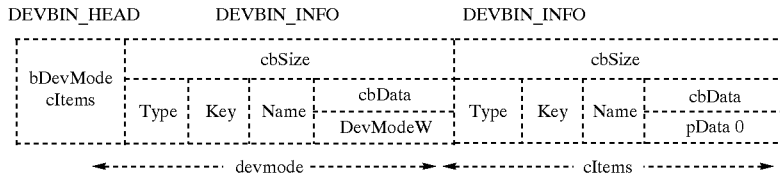

Meanwhile, an exemplary .DAT file contains a list of flags that are defined as follows:

/x—flags the Add Printer Wizard to call WebPNPEntry() and WebPostPNP entry() during the installation of the printer;

/b<base-name of printer>—flags the base name that the printer will be called when installed;

/r<http port name>—flags the port name that is specified as the output destination for the printer;

/f<inf file>—flags the name of the .INF file that is processed by the Add Printer Wizard;

/m<printer driver name>—flags the model name of the printer driver;

/n<network printer share name>—flags the network name that the Add Printer Wizard will use when first attempting a remote procedure call connection; and /a<printer information file>—flags the name of the .BIN file.

As mentioned previously, once .DAT, and .BIN files have been compiled, these files are also compressed in step 134 into the cabinet file. For a more thorough discussion of cabinet files and how they are created, the reader is referred to pending U.S. patent application Ser. No. 08/634,390. The cabinet file is then returned in step 136 to the network client 20 over the network 68 utilizing the system network server 74.

Figure 8:
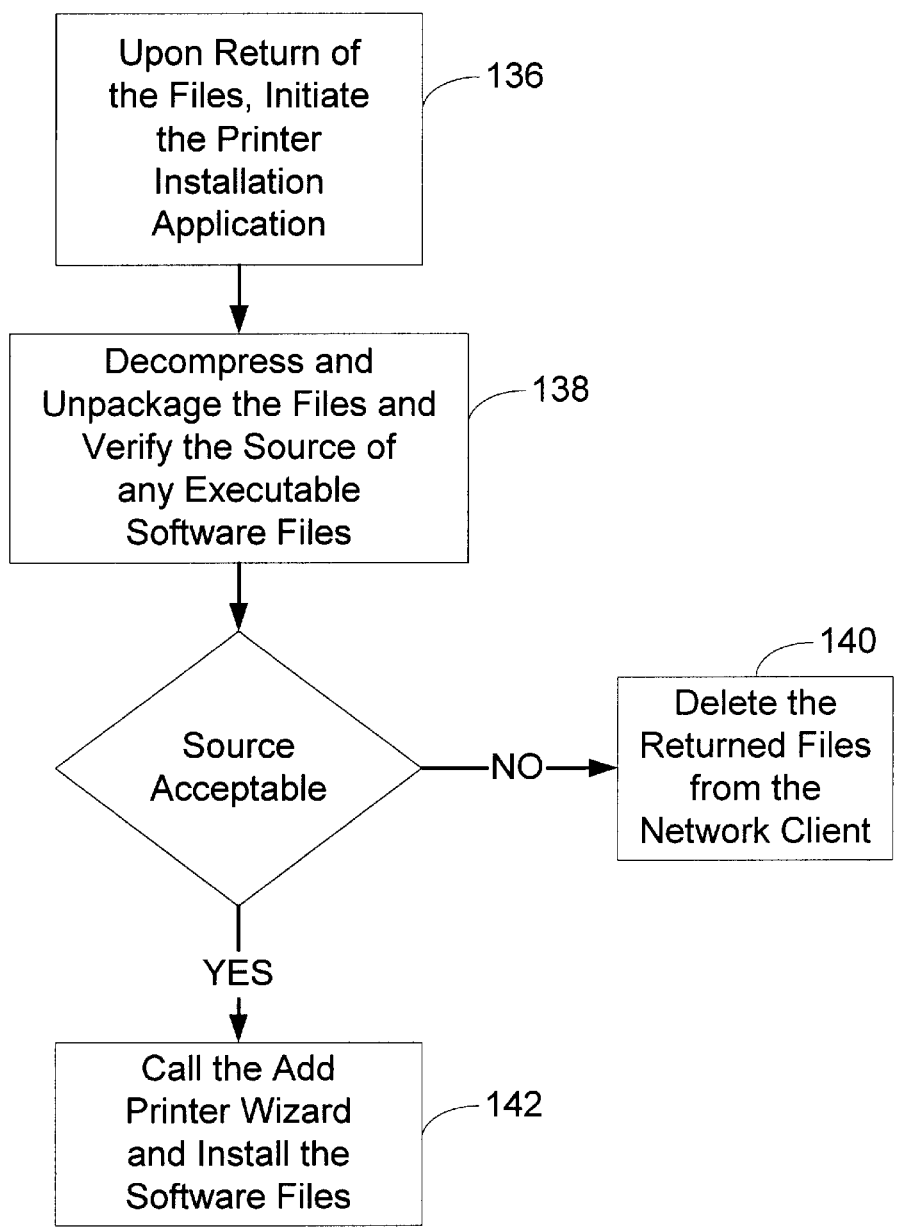
FIG. 8 illustrates a flow chart diagram of the steps for installing the requested software files on network client.

With reference to FIG. 8, once the cabinet file is returned to the network client 20, a file associating process of the operating system of the network client 20 will recognize the .IPP file extension provided to the cabinet file and, in response thereto, will cause the resident Printer Installer Application 82 (WPNINST.EXE) to start executing in step 136. The Printer Installer Application 82 functions to decompress and unpack the files in step 138 and, thereafter, to initiate in step 140 the verification of the executable software files which were supplied by the network server 49. For example, the verification process may be performed by calling Microsoft's Authenticode API which functions to present the user with a visual presentation of the digital signatures of the issuing agency of all the executable software files and, thereafter, inquire as to whether the user wishes to accept or reject the software files. If the user refuses to accept any one of the executable software files, the Printer Installer Application 82 preferably will delete in step 140 from the memory of the network client 20 all the software files returned by the network server 49 in response to the issued request message. If the downloaded software files are acceptable to the user, the Printer Installer Application 82 will cause in step 142 the Add Printer Wizard to execute which functions to install the printer on the network client 20. As more thoroughly described in pending U.S. patent application Ser. No. 08/641,087, entitled "Automatic Installation Of Printers In A Distributed Environment", which has been incorporated herein by reference in its entirety, the Add Printer Wizard utilizes the information contained within the .BIN and .DAT files, in connection with its routines, to initialize the printer settings to that of the print server while placing the software files returned by the network server 49 in the appropriate memory locations on the network client 20. Once completed, the printer 50 is effectively installed on the network client 20 and may be utilized to perform printing operations at the request of the network client 20.

From the foregoing descriptions, it will be appreciated that the invention described herein provides an improved method by which vendors may distribute their software. In particular, by providing digital signatures to the individual, downloaded executable software files, incorporating the Printer Installation Application as a component part of the operating system environment of the network client, supplying network client platform information to the network server for use in the software file retrieval process, and utilizing the HTTP protocol the drawbacks associated with currently used methods for downloading software over a network, which have been discussed previously, have been minimized. Accordingly, it is believed that the improved method disclosed herein will be more readily accepted and utilized by software users leading to a decreased need for software vendors to mass produce and distribute their software through conventional channels.

In view of the many possible embodiments to which the principles of this invention may be applied, it should be recognized that the embodiments described herein with respect to the drawing figures is meant to be illustrative only and should not be taken as limiting the scope of invention. For example, those of skill in the art will recognize that the elements of the illustrated embodiments shown in software may be implemented in hardware and vice versa or that the illustrated embodiments can be modified in arrangement and detail without departing from the spirit of the invention. Additionally, while the described embodiment is directed toward the installation of a printer, those of skill in the art will appreciate that the teachings presented herein may be used to install other forms of software on the network client. Therefore, the invention as described herein contemplates all such embodiments as may come within the scope of the following claims and equivalents thereof.

We claim:

1. In a network client in communication with a network server over a computer network, a method of distributing a software file resident on the network server to the network client, the method comprising the steps of:

receiving a command that the software file is to be downloaded to the network client;

automatically retrieving, in response to the command, information indicative of a platform of the network client;

appending to an HTTP formatted request message that requests that the software file be downloaded to the network client a data field comprising a representation of the information indicative of the platform of the network client;

issuing to the network server the HTTP formatted request message;

receiving from the network server in response to the issued HTTP formatted request message the software file; and installing the software file in an appropriate memory location associated with the network client.

2. The method as recited in claim 1, further comprising the step of displaying a graphical user interface that provides a means for a user of the network client to generate the command that the software file be downloaded.

3. The method as recited in claim 2, wherein the graphical user interface is caused to be displayed by an Internet browser application using HTML coded instructions received from the network server.

4. The method as recited in claim 3, wherein the HTML coded instructions include instructions for displaying an activatable icon that generates the command when it is activated.

5. The method as recited in claim 1, wherein the step of polling the network client comprises the step of retrieving from a registry file associated with the network client a brand and version number of a operating system resident on the network client and a system processor architecture of the network client.

6. The method as recited in claim 1, wherein the software file to be retrieved is utilized to install a hardware device on the network client and the method further comprises the steps of displaying a graphical user interface that allows a user to specify the hardware device to be installed and generate the command that the software file is to be downloaded.

7. In a network client in communication with a network server over a computer network, a method of distributing software files resident on the network server to the network client, the method comprising the steps of:

receiving a command that the software files are to be downloaded to the network client;

automatically retrieving, in response to the command, information indicative of a platform of the network client;

appending to an HTTP formatted request message that requests that the software files be downloaded to the network client a data field containing the information indicative of the platform of the network client;

issuing to the network server the HTTP formatted request message;

receiving from the network server in response to the issued HTTP formatted request message a cabinet file which contains the software files appropriate for the platform of the network client, the cabinet file having a file extension;

checking the file extension of the cabinet file and, as a function of the file extension, executing an appropriate installation application which is component application of the operating system environment resident on the network client which performs the steps of extracting the software files from the cabinet file and installing the software files in an appropriate memory location associated with the network client.

8. The method as recited in claim 7, wherein any executable software files contained within the cabinet file have an associated digital signature and wherein the installation application performs the further step of initiating a check of each of the digital signatures before performing the step of installing.

9. The method as recited in claim 8, wherein the step of initiating a check of each of the digital signatures further comprises the step of displaying a graphical user interface which provides a means for a user to indicate whether to accept or reject the executable software files.

10. The method as recited in claim 7, wherein the software files are utilized to install a printer on the network client and the step of installing the software files includes the step of utilizing an Add Printer Wizard which is a component application of the operating system environment of the network client.

11. A method of distributing software in a computer network comprising a network client linked to a network server having resident software files, the method comprising the steps of:

displaying a graphical user interface to a user on the network client which allows a user to issue a command that the software files are to be downloaded to the network client;

automatically retrieving, in response to the command, information indicative of a platform of the network client;

appending to an HTTP formatted request message that requests that the software files be downloaded to the network client a data field comprising data representative of the information indicative of the platform of the network client;

issuing from the network client to the network server the HTTP formatted request message;

collecting the software files at the network server as a function of the information wherein all executable software files have an associated digital signature;

packaging the collected software files into a cabinet file having a file extension;

sending the cabinet file to the network client from the network server; and performing at the network client a check of the file extension of the sent cabinet file and, as a function of the file extension, executing an appropriate installation application which is component application of the operating system environment resident on the network client which performs the steps of extracting the software files from the cabinet file, initiating a check of the authenticity of each of the executable software files as a function of the digital signatures, and, if the executable software files are deemed to be acceptable, installing the software files in an appropriate memory location associated with the network client.

12. The method as recited in claim 11, wherein the step of polling the network client comprises the step of retrieving from a registry file associated with the network client a brand and version number of an operating system resident on the network client and a system processor architecture of the network client.

13. The method as recited in claim 11, wherein the step of initiating a check of each of the digital signatures further comprises the step of displaying a graphical user interface which provides a means for a user to indicate whether to accept or reject each of executable software files.

14. A computer-readable media having computer-executable instructions for use in performing a distribution of a software file resident on a network server to a network client, the instructions performing steps comprising:

automatically retrieving from the network client in response to a command to initiate the distribution of the software file information indicative of a platform of the network client;

appending to an HTTP formatted request message that requests that the software file be downloaded a data filed comprising data representative of the information indicative of the platform of the network client;

issuing to the network server the HTTP formatted request message; and installing the software file in an appropriate memory location associated with the network client in response to a return receipt of the software file from the network server.

15. The computer-readable media as recited in claim 14, further comprising instructions for performing the step of displaying a graphical user interface that provides a means for a user of the network client to generate the command which initiates the distribution.

16. The computer-readable media as recited in claim 15, further comprising instructions for generating the graphical user interface in connection with an Internet browser application.

17. The computer-readable media as recited in claim 14, wherein the instructions for performing the step of polling the network client further comprise instructions for performing the step of retrieving from a registry file associated with the network client a brand and version number of an operating system resident on the network client and a system processor architecture of the network client.

18. An HTTP formatted message for use in requesting the distribution of software resident on a network server to a network client whereby a printer may be installed on the network client, the message comprising:

a first data field containing data representing a URL address of the network server;

a second data field containing data representing a request to the network server to return the software;

a third data field containing data representing an identification of the printer which is to be installed; and a fourth data field containing data representing an identification of the platform of the network client comprising a representation of a major version number of an operating system resident on the network client, a representation of a minor version number of the operating system, a representation of the brand of the operating system, and a representation of a processor architecture of the network client.

APPENDIX A

{WinPrtHTMLPreProc=WinPrint}
<!PRINTER PROPERTY>
<!build 6/19 v1.0>
<!DOCTYPE HTML PUBLIC "–//IETF//DTD HTML//EN">
<html>
<head>

-continued

APPENDIX A

```
<meta http-equiv="Refresh" content="120">
<meta http-equiv="Content-Type"
content ="text/html">
<meta name ="GENERATOR" content ="Microsoft FrontPage 2.0">
<title>Properties for {=WinPrint.Printername}</title>
<script language="VBScript">
sub cmdCliInfo_onClick()
    Document.MyForm.vParam.value = Obj. ClientInfo
    Document.MyForm.Submit
end sub
</script>
</head>
<form method=get action="{=WinPrint.ActionTagPrefix }WinPrin
t/PrinterProperty{=WinPrint.ActionTagPostfix }">
<body bgcolor="#808080" link="#000080"vlink="#800080"
topmargin="0" leftmargin="0">
<table border="0" cellpadding="0" cellspacing="0" width="100%
">
    <tr>
        <td align="right" colspan="14"><img src="{=WinPrint.We
    bDataURL}prprops.gif"></td>
        <td bgcolor="#808080"> </td>
    </tr>
    <tr>
        <td colspan="15"> </td>
    </tr>
    <tr>
        <td width="5%"> </td>
        <td width="8%" bgcolor="#FFFFFF"> </td>
        <td width="1%" bgcolor="#FFFFFF"> </td>
        <td width="10%" bgcolor="#FFFFFF"> </td>
        <td width="10%" bgcolor="#FFFFFF"> </td>
        <td width="10%" bgcolor="#FFFFFF"> </td>
        <td width="10%" bgcolor="#FFFFFF"> </td>
        <td width="10%" bgcolor="#FFFFFF"> </td>
        <td width="11%" bgcolor="#FFFFFF"> </td>
        <td width="3%" bgcolor="#FFFFFF"> </td>
        <td width="3%" bgcolor="#FFFFFF"> </td>
        <td width="10%" bgcolor="#FFFFFF"> </td>
        <td width="2%" bgcolor="#FFFFFF"> </td>
        <td width="2%" bgcolor="#FFFFFF"> </td>
        <td width="5%"> </td>
    </tr>
    <tr>
        <td colspan="13" bgcolor="#800000"> </td>
        <td bgcolor="#FFFFFF"> </td>
        <td> </td>
    </tr>
    <tr>
        <th align="left" colspan="13" bgcolor="#800000"><font
    color="#FFFFFF" size="5" face="Arial" > Properties
for<em>{=WinPrint.PrinterName}</em> on <em>{=WinPrint.M
achineName}</em></font></th>
        <td bgcolor="#FFFFFF"> </td>
        <td> </td>
    </tr>
    <tr>
        <td colspan="13" bgcolor="#800000"> </td>
        <td bgcolor="#FFFFFF"> </td>
        <td> </td>
    </tr>
    <tr>
        <td> </td>
        <td bgcolor="#FFFFFF"> </td>
        <td colspan="11" bgcolor="#C0C0C0"> </td>
        <td bgcolor="#FFFFFF"> </td>
        <td> </td>
    </tr>
    <tr>
        <td> </td>
        <td bgcolor="#FFFFFF"> </td>
        <td bgcolor="#C0C0C0"> </td>
        <td bgcolor="#C0C0C0"><font size="2"
        face="Arial">
Printer Model:</font></td>
        <td colspan="9" bgcolor="#C0C0C0"><font size="2"
            face="Arial">{=WinPrint.DriverName}</font></td>
        <td bgcolor="#FFFFFF"> </td>
```

-continued

APPENDIX A

```
        <td> </td>
    </tr>
    <tr>
        <td> </td>
        <td bgcolor="#FFFFFF"> </td>
        <td bgcolor="#C0C0C0"> </td>
        <td bgcolor="#C0C0C0"><font size="2"
        face="Arial"
Status:</font></td>
<td colspan="9" bgcolor="#C0C0C0"><font size="2"
        face="Arial">{=WinPrint.PrtStatusShort}</font></td>
        <td bgcolor="#FFFFFF"> </td>
        <td> </td>
    </tr>
    <tr>
        <td> </td>
        <td bgcolor="#FFFFFF"> </td>
        <td bgcolor="#C0C0C0"> </td>
        <td bgcolor="#C0C0C0"><font size="2"
        face="Arial">
Location:</font></td>
<td colspan="9" bgcolor="#C0C0C0"><font size="2"
        face="Arial">{=WinPrint.Location}</font></td>
        <td bgcolor="#FFFFFF"> </td>
        <td> </td>
    </tr>
    <tr>
        <td> </td>
        <td bgcolor="#FFFFFF"> </td>
        <td bgcolor="#C0C0C0"> </td>
        <td bgcolor="#C0C0C0"><font size="2"
        face="Arial"}
Comment:</font></td>
<td colspan="9" bgcolor="#C0C0C0"><font size="2"
        face="Arial">{=WinPrint.Comment}</font></td>
        <td bgcolor="#FFFFFF"> </td>
        <td> </td>
    </tr>
    <tr>
        <td> </td>
        <td bgcolor="#FFFFFF"> </td>
        <td colspan="11" bgcolor="#C0C0C0"> </td>
        <td bgcolor="#FFFFFF"> </td>
        <td> </td>
    </tr>
    <tr>
        <td> </td>
        <td bgcolor="#FFFFFF"> </td>
        <td bgcolor="C0C0C0"> </td>
        <td align="right" colspan="10" bgcolor="#C0C0C0">
            <input type="Submit" value="Apply">  &n
bsp;</td>
        <td bgcolor="#FFFFFF"> </td>
        <td> </td>
    </tr>
    </form>
    <tr>
        <td> </td>
        <td bgcolor="#FFFFFF"> </td>
        <td colspan="11" bgcolor="#C0C0C0"> </td>
        <td bgcolor="#FFFFFF"> </td>
        <td> </td>
    </tr>
    <tr>
        <td> </td>
        <td bgcolor="#FFFFFF"> </td>
        <td colspan="11" bgcolor="#FFFFFF"> </td>
        <td bgcolor="#FFFFFF"> </td>
        <td> </td>
    </tr>
    <tr>
        <td> </td>
        <td bgcolor="#FFFFFF"> </td>
         <td colspan="11"bgcolor="#000000"><font color="#FFFFF"
            size="2" face="Arial">  </font><font
            color="#FFFFFF" size="1"face="Arial"><strong>Links</s
trong></font></td>
        <td bgcolor="#FFFFFF"> </td>
```

-continued

APPENDIX A

```
        <td> </td>
    </tr>
    <tr>
        <td> </td>
        <td bgcolor="#FFFFFF"> </td>
        <td colspan="11" bgcolor="#C0C0C0"> </td>
        <td bgcolor="#FFFFFF"> </td>
        <td> </td>
    </tr>
    <tr>
        <td> </td>
        <td bgcolor="#FFFFFF"> </td>
        <td colspan="11" bgcolor="#C0C0C0 "><font size="2"
        face="Arial">
{=WinPrint.IfInstallSupported}

<form name="MyForm" action="{=WinPrint.PrinterCommandURL
}?CreateExe" method="post">
<input name="vParam" value="0" type="hidden">
<input type="button"value="Install Printer"name=cmdCliInfo"
>
</form>
{=Winprint.Endif}
        </font></td>
        <td bgcolor="#FFFFFF"> </td>
        <td> </td>
    </tr>
    <tr>
        <td> </td>
        <td bgcolor="#FFFFFF">  </td>
        <td colspan="11" bgcolor="#C0C0C0"><font size="2"
        face="Arial">   <a href="{=WinPrint.PrinterC
ommandURL}?PrinterSchedule">Printer Scheduling</a></font></
td>
        <td bgcolor="#FFFFFF"> </td>
        <td> </td>
    </tr>
    <tr>
        <td> </td>
        <td bgcolor="#FFFFFF"> </td>
        <td colspan="11" bgcolor="#C0C0C0"><font size="2"
        face="Arial">   <a href="{=WinPrint.PrinterC
ommand URL}?PrinterShare">PrinterSharing</a></font></td>
        <td bgcolor="#FFFFFF"> </td>
        <td> </td>
    </tr>
    <tr>
        <td> </td>
        <td bgcolor="#FFFFFF"> </td>
        <td colspan="11" bgcolor="#C0C0C0"><font size="2"
        face="Arial">  <a href="{=WinPrint.PrinterC
ommandURL}?PageSetup">PageSetup</a></font><td bgcolor="#
FFFFFF"> </td>
        <td> </td>
    </tr>
    <tr>
        <td> </td>
        <td bgcolor="#FFFFFF"> </td>
        <td bgcolor="C0C0C0"> </td>
        <td align="right" colspan="10" bgcolor="#C0C0C0"><a
        href="{=WinPrint.PrtFolderURL}"><{fontsize="2" face="
Arial"><strong><img
        src="{=Winprint.WebDataURL}prfolder.gif" align="middle"
        border="0"></strong></font></a>  <a
        href="{=WinPrint.PrtFolderURL}"><font size="2" face="Ar
ial"><strong>View Printers on
        {=WinPrint.MachineName}</strong></font></a> &n
bsp; </td>
        <td bgcolor="#FFFFFF"> </td>
        <td> </td>
    </tr>
    <tr>
        <td> </td>
        <td bgcolor="#FFFFFF"> </td>
        <td colspan="11" #bgcolor="#C0C0C0"> </td>
        <td bgcolor="#FFFFFF"> </td>
        <td> </td>
    </tr>
```

APPENDIX A-continued

```
    <tr>
        <td> </td>
        <td bgcolor="#FFFFFF"> </td>
        <td colspan="11" bgcolor="#FFFFFF"> </td>
        <td bgcolor="#FFFFFF"> </td>
        <td> </td>
    </tr>
        <tr>
        <td colspan="15" bgcolor="#808080">  </td>
        </tr>
</table>
```

APPENDIX A-continued

```
<object id="Obj" classid="clsid:92337A8C-E11D-11D0-BE48-00C04FC30DF6"
        align="baseline" border="0" width="10" height="10">
</object>
</body>
</html>
```

* * * * *

UNITED STATES PATENT AND TRADEMARK OFFICE
CERTIFICATE OF CORRECTION

PATENT NO.    : 6,094,679
DATED         : July 25, 2000
INVENTOR(S)   : Teng et al.

It is certified that error appears in the above-identified patent and that said Letters Patent is hereby corrected as shown below:

Column 1,
Line 32, "08/641,087 U.S. Pat. No. 5,692,111," should read:
-- 08/641,087, (now issued U.S. Pat. No. 5,692,111), --.
Lines 37, 50, 54 and 55, "'087" should read -- '111 --.

Column 2,
Line 5, "No. 08/634,390 entitled" should read:
-- No. 08/634,390 (now issued as USPN 6,049,671) entitled --.
Lines 10, 21 and 34, "'390" should read -- '671 patent --.

Column 7,
Line 12, "Preferably" should read -- preferably --.

Column 8,
Line 54, "No. 08/634,390 entitled" should read:
-- No. 08/634,390 (now issued as USPN 6,049,671) entitled --.

Column 10,
Line 7, "No. 08/641,087, entitled" should read:
-- No. 08/641,087 (now issued as USPN 5,692,111), entitled --.

Signed and Sealed this

Second Day of September, 2003

JAMES E. ROGAN
*Director of the United States Patent and Trademark Office*